Nov. 28, 1967   M. PANERAI ET AL   3,354,554
ELECTROLUMINESCENCE DEVICE SUITABLE FOR CONTINUOUSLY
INDICATING THE TILT OF A ROCKING OR
SLANTING PLANE IN RELATION TO
HORIZONTAL REFERENCE PLANE
Filed June 16, 1965
4 Sheets-Sheet 1
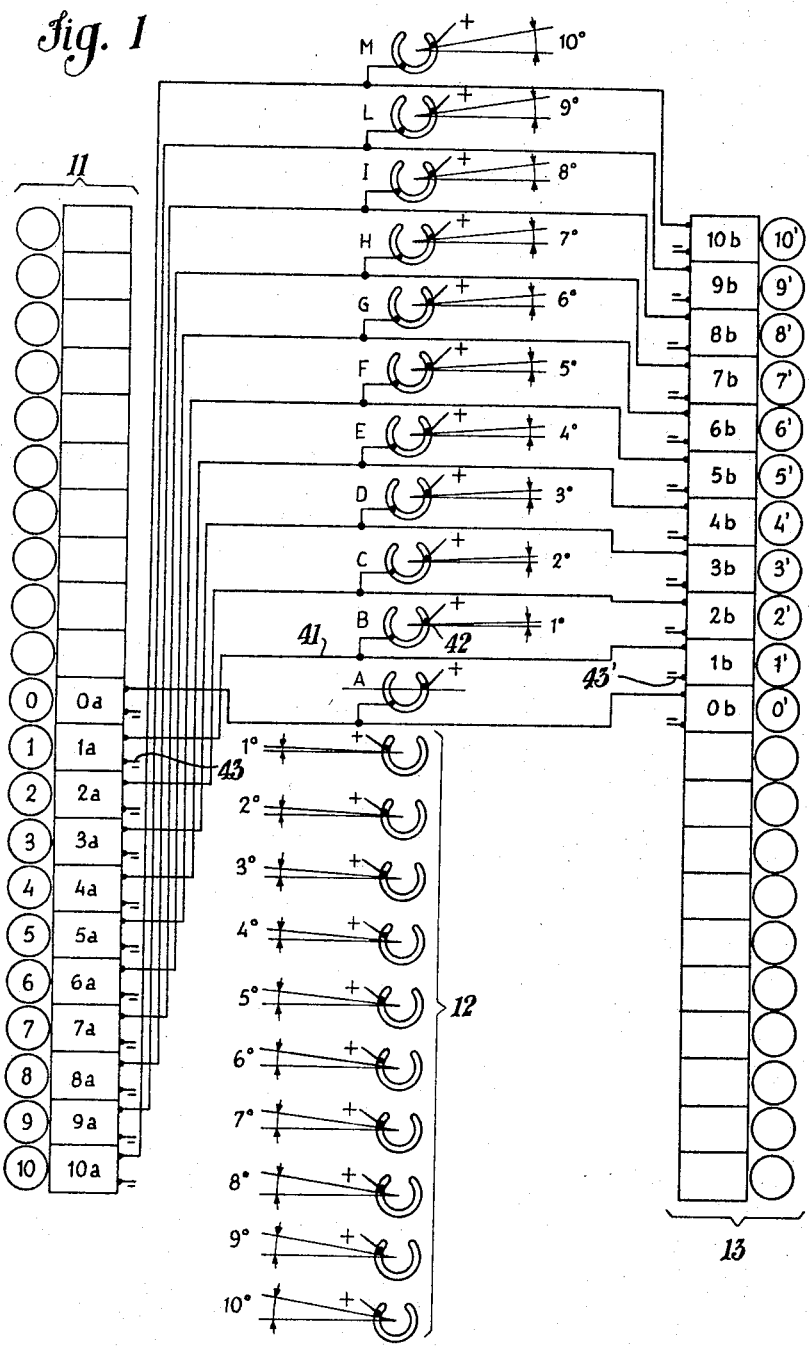
INVENTORS
MARIA PANERAI &
GIUSEPPE PANERAI
BY
Mason, Fenwick & Lawrence
ATTORNEYS Nov. 28, 1967　　M. PANERAI ET AL　　3,354,554
ELECTROLUMINESCENCE DEVICE SUITABLE FOR CONTINUOUSLY
INDICATING THE TILT OF A ROCKING OR
SLANTING PLANE IN RELATION TO
HORIZONTAL REFERENCE PLANE
Filed June 16, 1965　　4 Sheets-Sheet 2
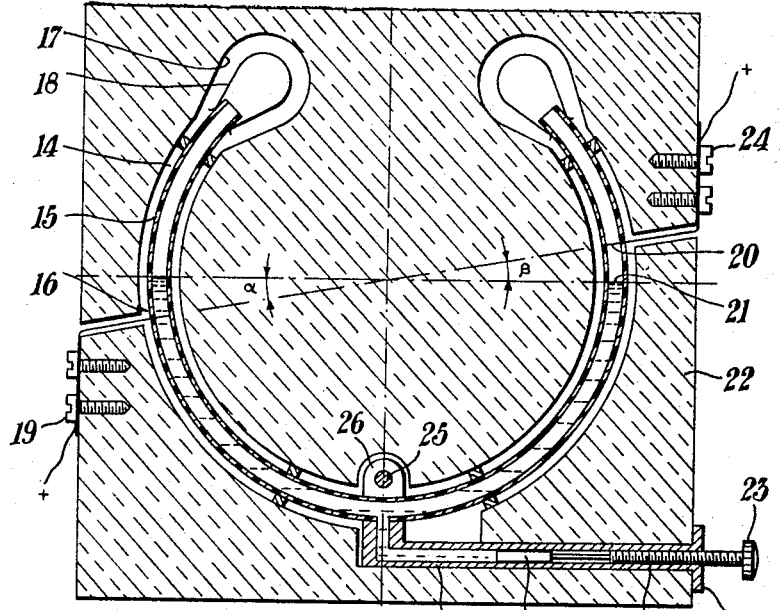
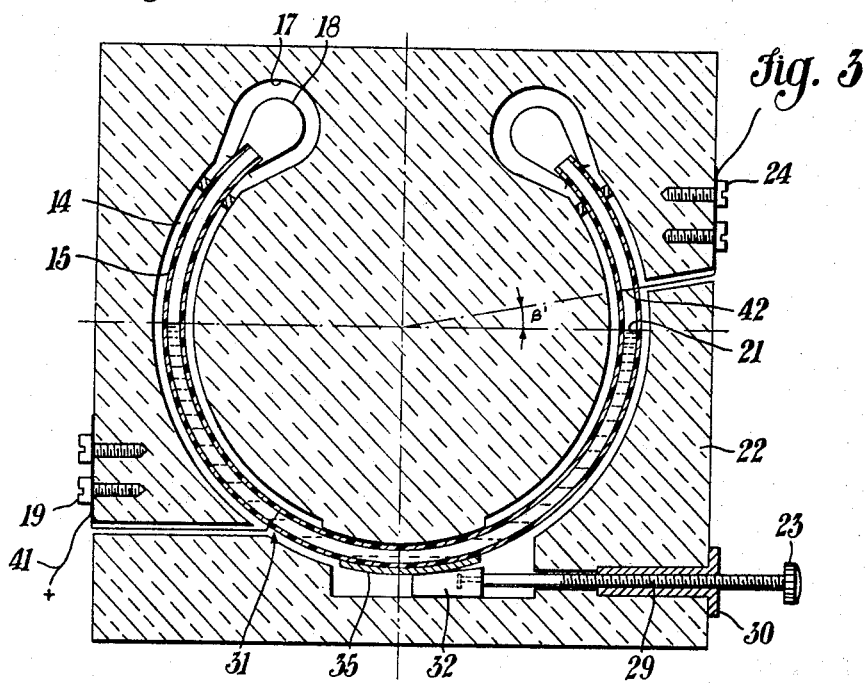
INVENTORS
MARIA PANERAI &
GIUSEPPE PANERAI
BY
Mason, Fenwick & Lawrence
ATTORNEYS INVENTORS
MARIA PANERAI &
GIUSEPPE PANERAI
BY
Mason, Fenwick & Lawrence
ATTORNEYS United States Patent Office 3,354,554
Patented Nov. 28, 1967

3,354,554
ELECTROLUMINESCENCE DEVICE SUITABLE FOR CONTINUOUSLY INDICATING THE TILT OF A ROCKING OR SLANTING PLANE IN RELATION TO HORIZONTAL REFERENCE PLANE
Maria Panerai and Giuseppe Panerai, both of 2 Piazza Galileo Ferraris, Florence, Italy
Filed June 16, 1965, Ser. No. 464,436
Claims priority, application Italy, June 22, 1964, 13,462/64
1 Claim. (Cl. 33—206)

ABSTRACT OF THE DISCLOSURE

An inclination indicator for a tiltable plane having spaced electroluminescent panels controlled by mercury switches having contacts activated sequentially to indicate degrees of tilt and horizon position.

---

The present invention refers to an electroluminescence device, suitable for continuously indicating the tilt of a rocking or slanting plane in relation to a horizontal reference plane.

As it is known, in many cases of the technique it is necessary to know the tilt of a rocking member in relation to a reference plane, for example, to a horizontal plane; this being the case of ship-mounted landing platforms for helicopters. For safety in the landing stage, particularly in the night-time hours or in conditions of poor visibility, it is imperative that the pilot has a clear perception of the heel or rolling angle of the ship (and therefore of the landing platform integral therewith) in order to be able to judge the opportunity of carrying out the maneuver with an absolute safety.

In order to solve the hereinabove stated problem several devices were devised and fabricated, but said devices proved to be rather cumbersome and complex, and therefore liable to failures, and their indications are effected with a certain inertia which alters the reliability thereof.

The object of the invention is to provide a device of the mentioned kind, capable of readily and faithfully providing a luminous display, visible from a great distance, immediately and instinctively interpretable, continuously indicating the position of the horizon in relation to the ship plane, the amount of tilt of the ship plane in relation to the horizon, and the direction of said tilt.

This invention provides a device comprising, in combination, a pair of dials formed by a set of electroluminescence panels superimposed one on another and arranged at the two ends of a wall arranged athwart to the axis of the ship, designed to selectively and progressively light to show the amount and the direction of tilt of the ship plane, a second pair of dials also formed by two sets of electroluminescent panels arranged along the outer edges of the foregoing and designed to selectively light to indicate in any moment the horizon plane, and a double set of mercury switches shaped as a circular level, designed to cause the selective lighting of said two sets of panels depending on the angle of heel of the ship and the position of the horizon plane.

Said mercury switches are formed by circularly running flexible tubes provided with contacts leading to lighting circuits and with thermal compensation means arranged in a plane perpendicular to the axis of the ship, preferably near the center of gravity of the latter.

The invention will be now described with reference to the attached drawings, representing by way of illustration and not of limitation a preferred embodiment of the invention.

In the drawings:

FIGURE 1 shows the electric diagram of the electroluminescent indicating panels and the switches thereof;

FIGURE 2 shows the detail of one of the mercury switches for lighting the panels indicating the horizon plane;

FIGURE 3 shows one of the mercury switches controlling the lighting of the panels indicating the angle of heel;

Figure 4:
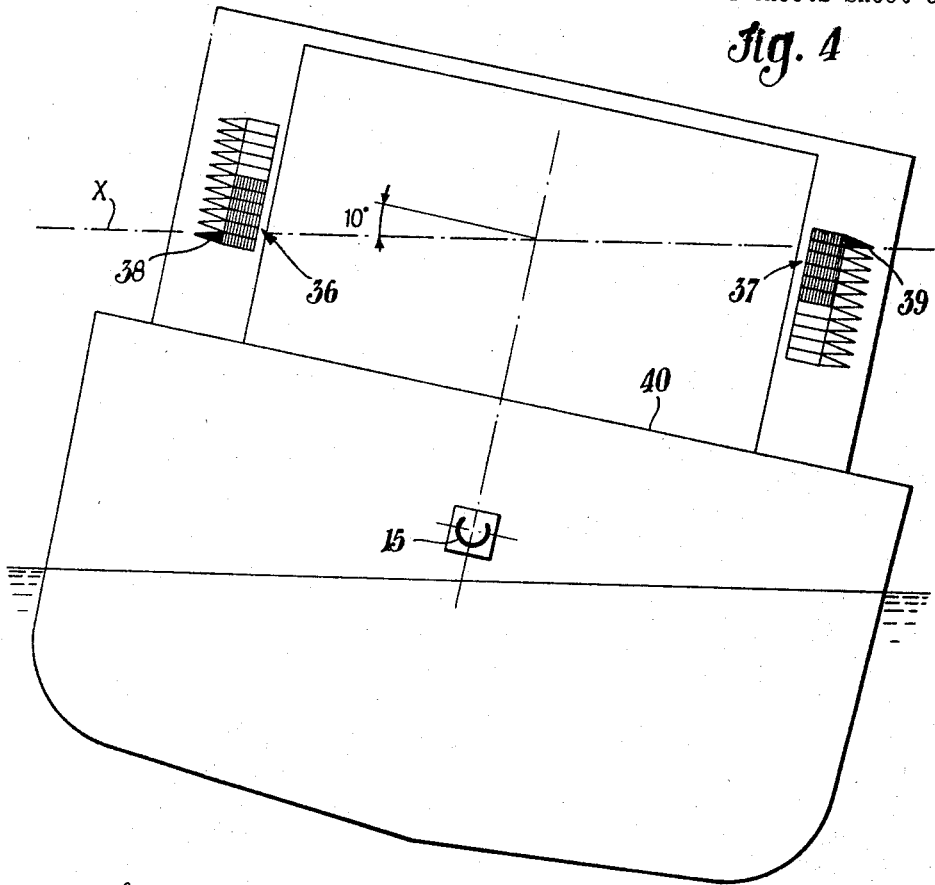
Figure 5:
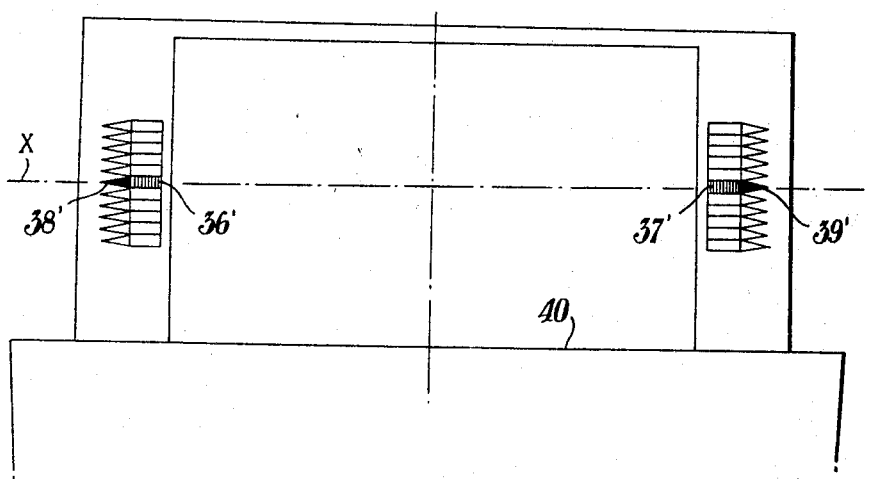
Figure 6:
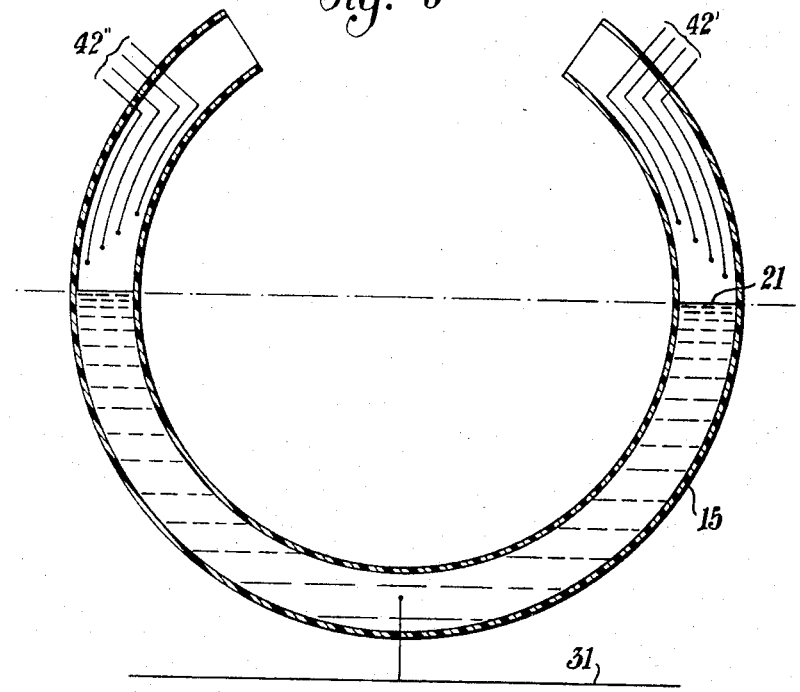
Figure 7:
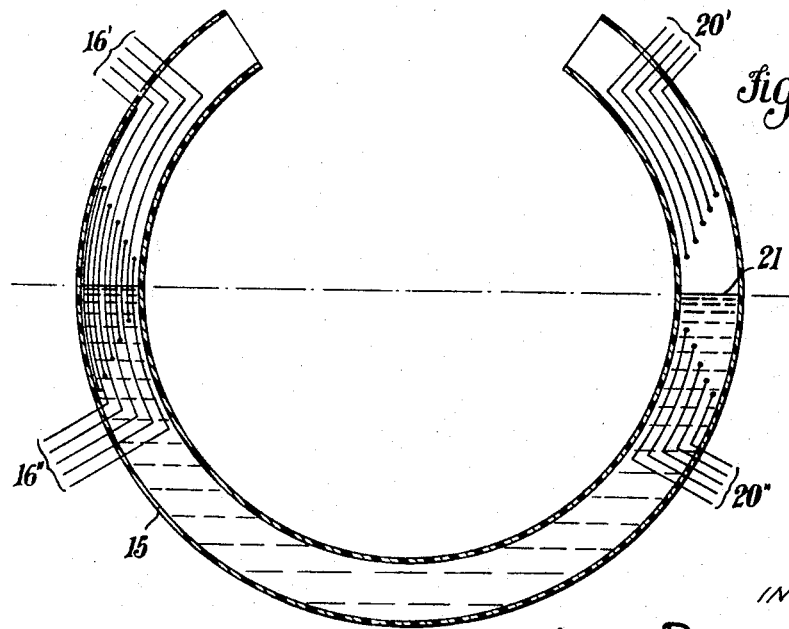

FIGURES 4 and 5 diagrammatically show two positions of the ship, with the respective indications of the electroluminescent dials, mounted at the two sides of the doorway of the on board hangar;

FIGURE 6 diagrammatically shows an alternative embodiment of the mercury switch for lighting the panels indicating the angle of heel;

FIGURE 7 diagrammetically shows an alternative embodiment of the mercury switch relative to the horizon line.

With reference to FIGURE 1, the electroluminescent panels designed to indicate the position of the horizon plane are represented by circles carrying the numerals from 1 to 10 for the left-hand set, and from 1' to 10' for the right-hand set. The panels relative to the dials indicating the angle of heel are represented by rectangles carrying the references from 1a to 10a for the left-hand set, and the references from 1b to 10b for the right-hand set.

In the central portion of the diagram, the letters from A to M are to indicate the mercury switches shaped like a level in form of an arc of circle, arranged in a suitable location of the ship, preferably near the center of gravity of the same, which as the result of the rolling motions make the circuits leading to said electroluminescent panels, causing them to light. In FIGURE 1, for sake of simplicity, only the circuits relative to the indication of the right-hand heel (in the direction of forward motion of the ship) have been shown, it being however understood that similar symmetrical circuits connect the sets of panels 11 and 13 with the mercury switches 12, for the indication of the left-hand heel.

The "degree of sensitivity" of the system may be any degree, by way of an example in FIGURE 1 the diagram refers to changes of one degree, with a maximum of ten degrees. Thus for example by referring to panels 1a and 1b indicating a heel of one degree, the conductors 43 and 43' terminate to a pole of the power source, while the conductor 41 is connected to the above said panels and to the lower end of the mercury switch B. The contact 42 makes the circuit only when the ship undergoes a heel of one degree, that is when the mercury level of B undergoes such an angular change, as it will be better shown in the following, and in such a way the panels 1a and 1b light up.

By extending the discussion to greater heel values, one has that for a heel of 10 degrees, all the panels of the two sets a and b are lit since one has the contact in all the switches from A to M.

With a circuit similar to the one described, one has the lighting of the two sets of panels from 1 to 10 and from 1' to 10' representing the position of the horizon. However, in this case one has the selective lighting of only one panel of the set from 1 to 10 and of the corresponding panel of the set from 1' to 10'. One of the control switches of the above said panels is shown in FIGURE 2. It is formed by a body 22 of insulating and transparent material, carrying a circular housing 14 in which it is arranged a flexible tube 15, also it circularly running containing a certain amount of mercury. At the two ends of the tube 15 there are provided two elastic bladders 18 arranged in the seats 17 having the purpose of compensating the inner pressures and vacuums. A pair of contacts 16 and 20 leading to the terminal screws 19 and 24 is aligned with an angle of 180° to the geometrical center of the assembly, with a phase displacement α to the mercury level 21. When the switch undergoes such a clockwise rotation as to cause an angular displacement β in the level 21 one has the simultaneous contact of the two conductors 16 and 20 and the lighting of the two panels (the right-hand and the left-hand panels) indicating the position of the horizon. The same discussion applies for the other pairs of panels, which are operatively connected with additional switches, carrying angularly offset contacts for different positions.

In FIGURE 3 it is shown one of the mercury switches controlling the lighting of the panels indicating the angle of heel.

In this case, the contact 31 (which is common to all the switches) is always immersed in the mercury, while the contact 42 is touched by the mercury only when the angle of heel β' takes the value which is to be indicated by the panel associated therewith. As said angle changes for each switch of the set, one will have the simultaneous lighting of all the panels indicating the heel values from the zero value to the value in that moment.

For the possible calibrations of the mercury level in the switches, the devices shown in FIGURES 2 and 3 are provided. In FIGURE 2 one has an adjusting screw 23 carried by a bushing 30, the shank 29 of which through a plunger 28 controls the mercury contained within an extension 27 connected to the switch by means of a pair of lugs 26 fastened by a screw 25.

In FIGURE 3 the screw 29 causes the displacement of a wedge 32 acting on the sliding plane 35 which causes a symmetrical deformation of the tube with the change of the mercury level resulting therefrom.

In place of the set of switches controlling the panels indicating the angle of heel, it is possible to provide only one multiple-contact switch of the type illustrated in FIGURE 6.

In this case, one has a common conductor 31' always immersed in the mercury, and two sets of contacts 42' and 42" placed at progressive angular positions, and designed to control the lighting of the panels associated therewith when the mercury level 21 makes the contact in the right-hand heel (contacts 42') and in the left-hand heel (contacts 42").

In FIGURE 7 it is shown a multiple-contact switch, suitable for controlling the horizon indicating panels. In this case four sets of contacts are provided, namely the sets 16' and 20' for the right-hand heel; and the two sets 16" and 20" for the left-hand heel. The operation is similar to that already described in connection with FIGURE 2.

In FIGURE 4 it is shown the assembly of the electroluminescent indicating panels as applied to the sides of the doorway of a hangar for helicopters on board of a ship. Assuming that the ship has a right-hand heel of 10°, and that each panel has a "sensitivity" of 2°, the pilot in the landing stages sees the panels 36 and 37 that are lighted to indicate amount and direction of heel; whereas the triangular panels 38 and 39 that are lighted represent the position of the horizon in relation to the ship plane 4.

The numeral 15 indicates the position of the mercury switches. By changing the trim of the ship, changes correspondently the number and the position of the lit up panels, wherefore the pilot has an exact "cinematographic" perception of the course of the phenomenon so as to be able to judge about the opportunity of landing and the relative procedures.

When the heel is zero, the horizon line defined by the panels 38' and 39' coincides with the no-value heel panels 36' and 37', as shown in FIGURE 5.

It is understood that the invention can be usefully employed also in applications other than the one described, such for example, surveys of heights, night-time topographic operations, angular controls in general and the like, with the advantageous feature that the indicating dials can be placed in a location even very remote from the zone in which the measurement is carried out.

The present invention has been described in a preferred embodiment thereof, it being however understood that changes and modifications may be entered without departing from the scope of the invention.

What is claimed is:

An inclination and reference plane indicating means for providing a visual indication of the degree of inclination of a plane in fixed relation to a movable support which is tiltable about a substantially horizontal axis and upon which said means is mounted, said means comprising a pair of horizontally spaced sets of indicator panels each comprising a normally vertical row of rectangular electroluminescent panels and an adjacent row of pointed triangular panels each triangular panel having two sides of equal length and a shorter side aligned with and abutting against an adjacent rectangular panel with the respective triangular panels of the two indicator panels pointing outwardly away from each other, a first mercury switch in an electrical circuit including said rectangular panels and an electrical source, said switch comprising a circular hollow tube mounted in a plane substantially perpendicular to said axis and having mercury within its interior and plural first contacts extending into said interior, each one of said first contacts being electrically connected to one of said rectangular panels, said first contacts being spaced within said tube so that when said plane is level one rectangular panel in each of said sets is illuminated and as said plane tilts the rectangular panels adjacent said one rectangular panel in each set are progressively lighted to provide an indication of the degree of inclination and in an order such that the last-lighted rectangular panel of one set is always horizontally aligned withthe last-lighted rectangular panel of the other set, and a second mercury switch in an electrical circuit including said triangular panels and said electrical source, said second switch comprising a circular hollow tube mounted in a plane substantially perpendicular to said axis and having mercury within its interior and plural second contacts extending into said interior, each one of sad second contacts being electrically connected to one of said triangular panels, said second contacts being spaced within said tube so that only the triangular panels adjacent said last-lighted rectangular panels are illuminated.

References Cited

UNITED STATES PATENTS

| | | | |
|---|---|---|---|
| 872,183 | 11/1907 | Jenning | 33—209 |
| 1,600,121 | 9/1926 | Mazade | 33—206.5 |
| 2,262,245 | 11/1941 | Moseley et al. | |
| 2,303,360 | 12/1942 | Irwin et al. | 33—206.5 |
| 2,532,883 | 12/1950 | Bennett et al. | 33—209 |
| 2,584,917 | 12/1952 | Powell | 33—206 |
| 2,789,362 | 4/1957 | Maroth | 33—206.5 |

FOREIGN PATENTS

| | | |
|---|---|---|
| 8,099 | 1911 | Great Britain. |
| 319,815 | 1917 | Germany. |
| 123,203 | 1919 | Great Britain. |

LEONARD FORMAN, *Primary Examiner.*

L. ANDERSON, *Assistant Examiner.*